A. FRASER.
Apparatus for Composing Type.
No. 224,166. Patented Feb. 3, 1880.
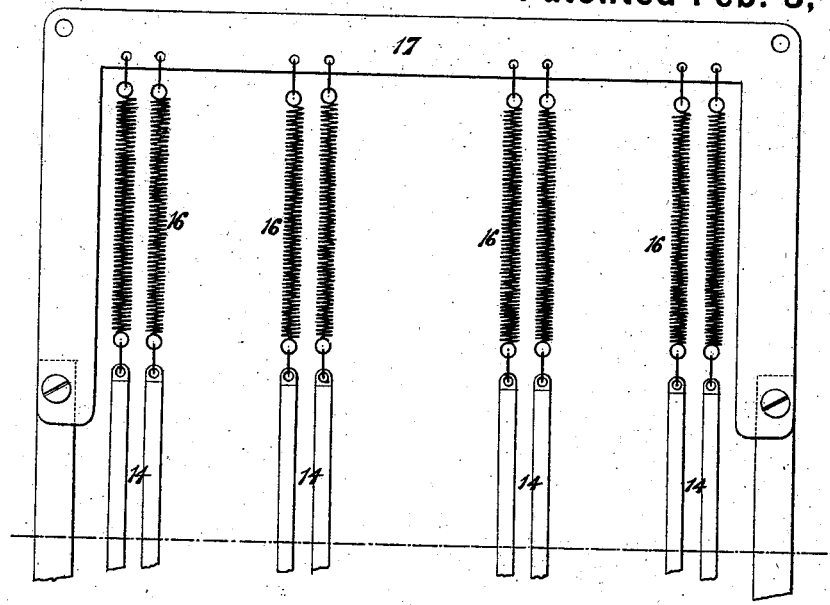
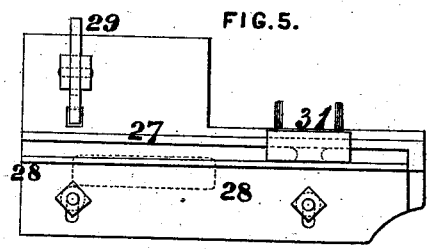
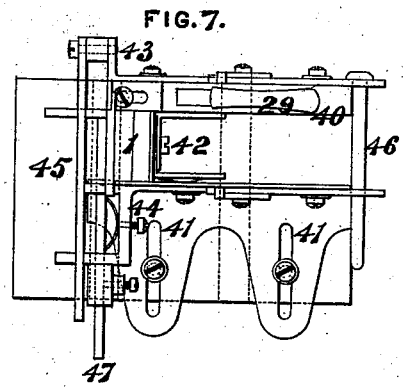
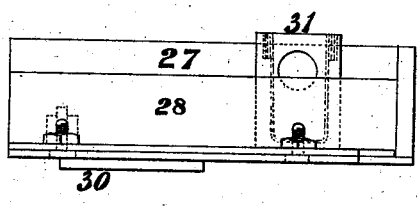
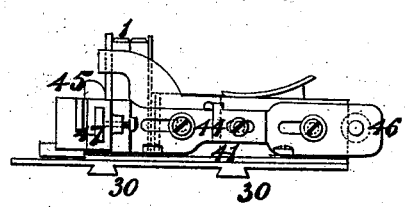
Witnesses
Henry Howson Jr.
Harry Smith
Inventor
Alexander Fraser
by his Attorneys
Howson and Son

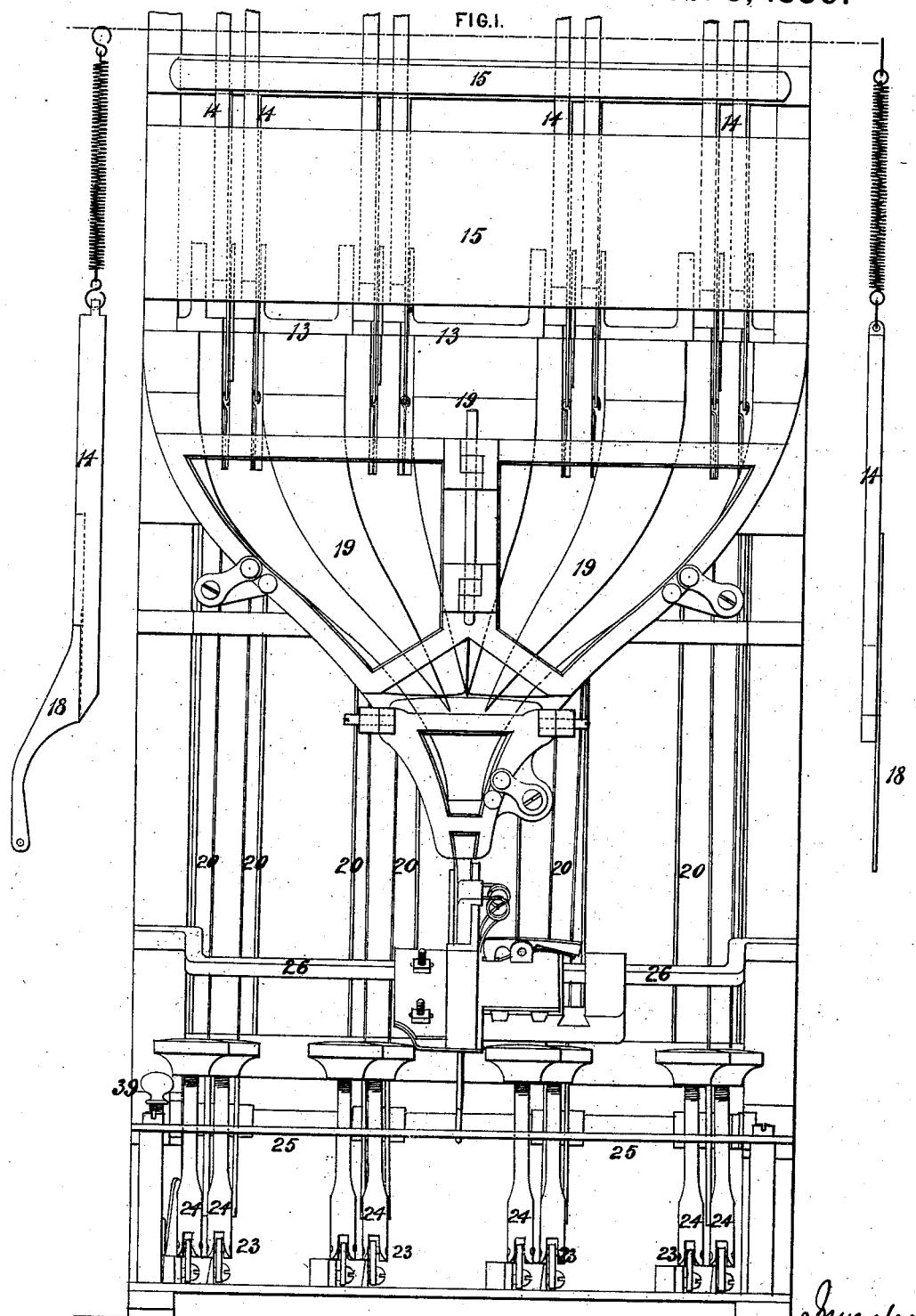

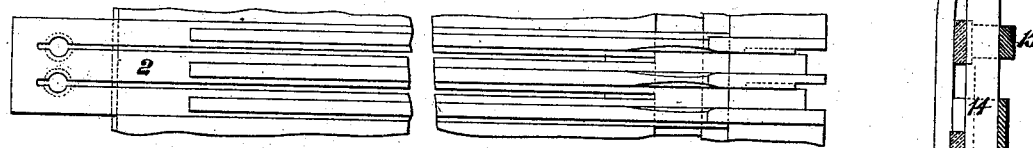
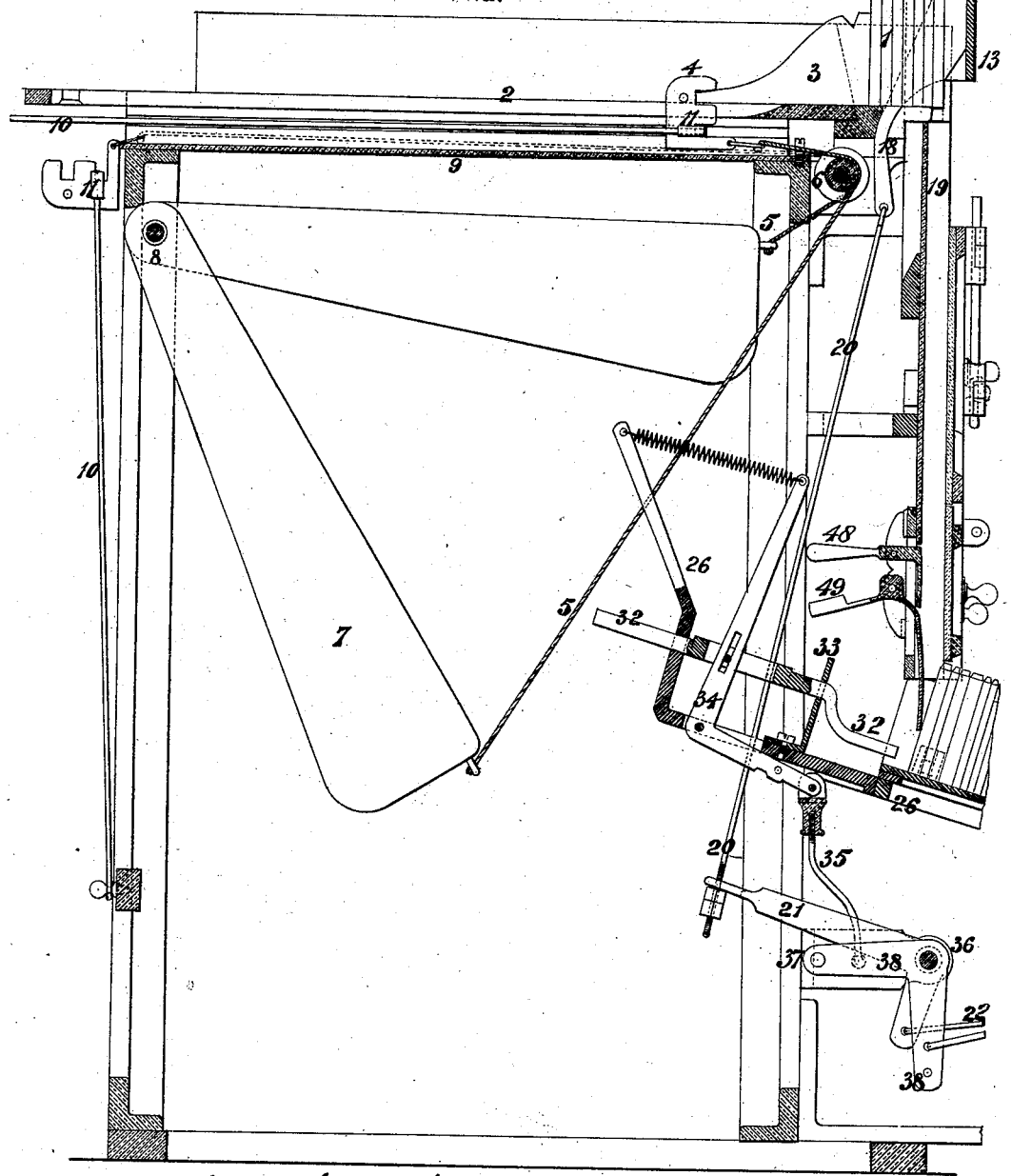

UNITED STATES PATENT OFFICE.

ALEXANDER FRASER, OF EDINBURGH, SCOTLAND.

APPARATUS FOR COMPOSING TYPES.

SPECIFICATION forming part of Letters Patent No. 224,166, dated February 3, 1880.

Application filed June 21, 1879. Parts patented in England, April 10, 1872, November 20, 1872, May 15, 1875, and August 10, 1877.

*To all whom it may concern:*

Be it known that I, ALEXANDER FRASER, of Edinburgh, in the county of Mid-Lothian, Scotland, have invented Improvements in Apparatus for Composing Types, of which improvements the following is a specification.

I have for several years been engaged in devising, practically testing, and perfecting apparatus for composing types and apparatus for distributing types, and I have obtained British patents of the following dates and numbers, namely: April 10, 1872, No. 1,060; November 20, 1872, No. 3,461; May 15, 1875, No. 1,812; August 10, 1877, No. 3,055.

The apparatus shown in the accompanying drawings, and for which I now desire to obtain Letters Patent of the United States, comprises my most recent improvements combined with such of my earlier devices as I have found to answer satisfactorily in actual practice; and I would remark that the practical success I have met with has not been due so much to single details as to the manner in which the various details are combined together.

In order to simplify the drawings, and also the description, the apparatus is shown as made for types of only eight different characters; but it is provided with at least one specimen of every kind of device that is required in a complete machine, and the complete machine simply requires to be made of a suitable size and with such repetitions of the various devices as the total number of type-characters to be employed renders necessary.

My type-composing apparatus is designed to be used in combination with type-distributing apparatus of a kind forming the subject of a separate application for Letters Patent of the United States; but it may also be used in combination with any other distributing apparatus which will arrange the types suitably for it; or the types may be arranged suitably for my composing apparatus by hand or in any other convenient way.

As my invention is distinguished mainly by minor details and combinations of such details, it will be most readily understood on my at once proceeding to particularly describe the apparatus with the aid of the accompanying drawings, the reference-numerals in which are used to mark the same or like parts wherever they are repeated.

Figure 1 is a front elevation of my type-composing apparatus, (with a small part at the top wanting.) Fig. 2 is a vertical section as at right angles to Fig. 1, and Fig. 3 is a plan of a portion of a type-tray and other parts. Fig. 4 is a front elevation of the part wanting in Fig. 1, the horizontal lines dotted across the two figures showing at what part they should be joined. Figs. 5 and 6 are a plan and a side elevation of a composing-stick, and Figs. 7 and 8 are a plan and side elevation of an adjustable galley to be used with the composing apparatus.

The types 1 are carried in vertical positions in rows upon type-trays 2, of which trays there are, by preference, two or more in a set, and two or more sets to each machine. All the types in each row are, of course, of one character, and are acted on as required by a special finger-key. Each type-tray 2 consists of a horizontal plate formed or fitted with vertical partition-slips, the spaces between which constitute the grooves for containing the types 1.

When the apparatus is ready for use the types 1 are pressed toward the front ends of their grooves in the trays 2 by pushers 3, which are metal pieces fitted to slide in the grooves and bear against the hindmost type of each row. The pushers 3 are caused to act upon the types 1 by means of small dogs 4, which project up through fine slots formed through the bottoms of the type-grooves, the dogs 4 being drawn forward by cords 5, which pass round pulleys 6, arranged loosely on a horizontal spindle near the front of the upper part of the apparatus. The cords 5 are connected to lever-weights 7, which are in the form of blades, all centered on a horizontal spindle, 8, at the back and upper part of the apparatus.

When a tray-groove is fully charged with types, with its pusher 3 pressing against the rearmost type, the corresponding lever-weight 7 is drawn up to a nearly horizontal position, and it then exerts its greatest force on the row of types 1, while as the row of types becomes shorter, and consequently more easily moved, the weight 7 correspondingly assumes, in descending, positions in which it acts with gradually-diminishing leverage and effective force.

The type-trays 2 are fitted to and set in rabbeted or recessed seats formed for them in the top frame-piece, 9, of the machine, and just below the seat of each type-tray 2 there is fitted to slide freely in a groove in the same frame-piece 9 a light wire frame, 10, having a notched cross-bar, 11, at its front end, and fitted for engaging with the dog 4. When it is required to remove a tray that has been more or less emptied of its types, by pulling back this frame 10 all the dogs 4 are drawn completely back by the notched bar 11, the lever-weights 7 being thereby lifted, and the frame 10 being then turned down into a vertical position and secured in that position, the dogs 4 are held back and the weights 7 up until the type-tray 2 has been removed and a charged one put in its place. When the fresh tray has been placed the frame 10 is turned up again and pushed forward, and the dogs 4 then engage with the pushers 3, and the parts are ready for operation without further adjustment.

When the type-trays 2 are in position on the composing-machine, the front ends of their partition-slips, which are slightly beveled, with their lower parts more forward, butt against partitions formed or fixed on a horizontal frame-bar, 13, the spaces between these partitions forming short continuations of the type-grooves. The types at the front end of each row move forward between the partitions on the frame-bar 13, and the foremost type bears against a depressor, 14, which works vertically in guides formed in lower and upper bars, 15.

A depressor, 14, is shown separately in side view at the left-hand side of Fig. 1 and in front view at the right-hand side of Fig. 1. It is made with a shoulder, which catches on the top of the front type and carries it down, and as the type bears against the part of the depressor below the shoulder and moves down in contact therewith, considerable friction (acting on the type in other machines) is avoided.

Each depressor 14 is held up by a helical metal spring, 16, connected to a fixed bar, 17, above, the spring allowing the depressor to be moved down when required, and raising it up again after each depression.

For moving each depressor 14 there is formed or fixed on one side of it a thin blade or fin, 18, the form of which is well seen in the detached view at the left-hand side of Fig. 1. The several fins 18 pass down between the lines of types, and thereby admit of simple and direct connections being made to them at the back or inner side of the grooved plate 19, down which the several types are guided, it being of great practical importance to have nothing in front of the covers of this grooved plate.

The depressors 14 are moved by wires 20, attached to their fins 18, and the several wires 20, appertaining to a number of rows of types, are at their lower ends attached to bell-crank levers 21. These levers 21 are connected, by a second set of wires, 22, to a second series of bell-crank levers, 23, which last are acted on by vertical key-rods 24, depressed, as required, by the compositor. These key-rods 24 have buttons on their upper ends marked to correspond to the types they respectively act on, and are guided by passing through holes in a horizontal plate, 25, while they are formed with slotted enlargements for the insertion of the ends of the levers 23. These levers 23 are centered on pins screwed into fixed frame-bars; but the key-rods and bell-cranks of one row are not placed directly behind those of another row, the rods and bell-cranks being displaced laterally to a sufficient extent to avoid interfering with each other.

The depressors 14 carry the types down through openings which allow only one type to pass at a time in each case, and the types then drop into grooves of a grooved plate, 19. This grooved plate 19 is constructed with entering-grooves at the top for all the types, and such grooves, uniting and converging as they descend, finally terminate in a single groove, from which the types are successively transferred to a composing-stick or galley in the order in which they have been depressed.

At the lower part of the terminating groove of the plate 19 there is placed a tongue, 48, centered on a horizontal pin, and below it a second tongue, 49, also centered on a horizontal pin, both tongues being counterweighted just sufficiently to make them bear lightly on thin types, and not to offer too much resistance to thicker types. These tongues assist in guiding the types into the composing-stick or galley, and preserve their vertical position.

The grooved plate 19 is provided with glass covers fixed in three separate frames—a bottom frame, hinged horizontally and opening upward, and two upper frames, hinged vertically. The glass covers prevent the types from turning round and allow of their being seen throughout their courses, and by opening the covers the grooved plate is easily accessible for the removal of any accidentally-arrested type.

The grooves in the plate 19 are made of different depths to suit the different thicknesses of the types.

The composing-stick (shown in plan and side elevation in Figs. 5 and 6) is carried, when in position for composing, upon an inclined bracket, 26, fixed to the framing of the machine just inside the terminating groove of the grooved plate 19. This composing-stick is constructed for setting the types in a single line, and consists of a metal plate formed with a vertical flange, 27, for one side of the types to rest against, and provided with an adjustable flanged piece, 28, which is attached to it by screws, to support the types on their other side. A spring-catch, 29, on a horizontal enlargement of the metal plate, engages with a slot formed in the inclined bracket 26 when the composing-stick is placed in position for composing. A rib, 30, of a dovetailed form in section, is formed on the under side of the composing-stick, and fits into a groove formed in the bracket 26, for holding the composing-stick securely in position. A movable stop-block, 31, fitting loosely into the groove formed by the vertical flanges 27 28 of the composing-stick, and having springs which gently gripe the flange 27, preserves the types in their proper vertical position in the composing-stick. This stop-block 31, along with any types already in the composing-stick, is moved forward to admit a fresh type, whenever depressed by the depressors 14, by means of a lever or pusher, 32, one end of which is guided in an arm formed on the bracket 26, while its forward end is guided in a vertical piece, 33, adjustably fixed to the bracket 26. A bell-crank lever, 34, centered in a slot in the bracket 26, has its longer arm attached at its end to a spring held by an obliquely-extended part of the bracket 26. The longer arm of the lever 34 passes through a slot in the pusher 32 and acts on a pin fixed across the slot. The shorter arm of the lever 34 is connected by a wire, 35, to an arm or lever working loosely upon the spindle 36, carrying the bell-cranks 21. The outer end of this arm carries a wire or rod, 37, extending horizontally across the machine under the longer arms of the bell-cranks 21, and this wire is carried at one end by an arm or lever loose on the spindle 36, and at the other by a bell-crank lever, 38, which is connected to a key-rod, 39, similarly to the key-rods 24. When a type is depressed by the action of any of the key-rods 24 the corresponding bell-crank lever 21, bearing upon the horizontal wire 37, depresses it, and, through the bell-crank 38 and its connections, causes the pusher 32, by its forward end, to push forward the types in the composing-stick, so as to make room for the type then being depressed. By depressing the key-rod 39 the pusher 32 may be actuated without at the same time depressing a type.

Figs. 6 and 7 show an improved form of galley to be used when it is desired to arrange the selected types in columns instead of a single line. The galley is formed with two dove-tail ribs on its under side, which, when the galley is placed in position for composing, enter dovetailed grooves in the inclined bracket 26, and the galley is held in position by a spring-latch, 29. The galley consists of a plate having a flange, 40, along one edge for one side of the column, while a flanged piece, 41, is adjustably attached by means of slots and screws for the other side of the column. Between the flanges 40 41 there is a sliding stop, 42, to support the first line of types, and it is made adjustable to suit different widths of column, while a small spring fitted to it bears on the side of the flange 41 and keeps it from moving too easily. On their outer sides the flanges 40 41 have bars 43 44 connected to them by slots and screw-pins, and at the entering end of the column these bars 43 44 carry a cross-bar, 45, which forms an outer guide for the types that are being entered one by one into a line. This bar 45 is hinged, so that it can be turned up out of the way when access to the types is required, and a rod, 46, passed through the bars 43 44 at the other end, is provided for moving the completed lines inward to make space for a fresh line.

When forming a line the types are supported in the direction of the line by a slide, 47, and each type is successively moved forward along with the slide 47 by the pusher 32.

The space for a line is gaged by stops upon the flanges 40 41 and bars 43 44, those on the latter being adjustable.

I claim—

1. The combination of sliding pusher-dogs 4 with type-trays having partition-slips, between which are grooves for the types, the said trays also having longitudinal slots through the bottoms of the grooves for the reception of said dogs, substantially as described.

2. The combination of the movable type-trays, having partition-slips with beveled ends, with the fixed frame-bar, having corresponding partitions adapted to said beveled ends, as set forth.

3. The combination of the type-pusher dogs 4 with light wire frames 10, for drawing back the dogs and retaining them in position, as and for the purpose specified.

4. The combination of the grooved plate 19 with the type-depressors 14, suspended by springs, and formed each with a shoulder to catch on the top of the type, and with a part below the shoulder to be in contact with the front type, and with pins 18, adapted to pass between the rows of types and behind the grooved plate 19, for attachment to the operating devices, as and for the purpose set forth.

5. The galley or column composer, having a fixed and an adjustable column-flange, combined with bars 43 44, fitted with adjustable stops and carrying an outer line-guide, 45, and sliding stop 47, the said bars 43 44 being movable for drawing a line into the column-space, all substantially as described.

ALEXANDER FRASER.

Witnesses:
THOMAS MCALPIN,
CLEMENT KINNIS.